(12) United States Patent
Coomer et al.

(10) Patent No.: US 7,917,655 B1
(45) Date of Patent: Mar. 29, 2011

(54) METHOD AND SYSTEM FOR EMPLOYING PHONE NUMBER ANALYSIS TO DETECT AND PREVENT SPAM AND E-MAIL SCAMS

(75) Inventors: Graham Coomer, Gloucester (GB); Nicholas Johnston, Cheltenham (GB)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 12/604,671

(22) Filed: Oct. 23, 2009

(51) Int. Cl.
G06F 15/16 (2006.01)
G06F 15/173 (2006.01)
G06F 15/177 (2006.01)

(52) U.S. Cl. ............ 709/248; 709/206; 726/22; 726/23; 726/4

(58) Field of Classification Search .................. 709/203, 709/206, 217–228, 248; 726/22, 23, 4, 16
See application file for complete search history.

(56) References Cited

U.S. PATENT DOCUMENTS

| 6,769,016 | B2 | 7/2004 | Rothwell et al. | |
|---|---|---|---|---|
| 2002/0133606 | A1* | 9/2002 | Mitomo et al. | 709/229 |
| 2006/0007868 | A1* | 1/2006 | Shinomiya | 370/241.1 |
| 2006/0020814 | A1* | 1/2006 | Lieblich et al. | 713/182 |
| 2006/0036748 | A1* | 2/2006 | Nusbaum et al. | 709/228 |
| 2006/0168042 | A1* | 7/2006 | Boivie et al. | 709/206 |
| 2006/0253583 | A1* | 11/2006 | Dixon et al. | 709/225 |
| 2006/0253584 | A1* | 11/2006 | Dixon et al. | 709/225 |
| 2007/0174624 | A1* | 7/2007 | Wolosewicz et al. | 713/176 |
| 2007/0250930 | A1* | 10/2007 | Aziz et al. | 726/24 |
| 2008/0005782 | A1* | 1/2008 | Aziz | 726/3 |
| 2008/0052359 | A1* | 2/2008 | Golan et al. | 709/206 |
| 2008/0104700 | A1* | 5/2008 | Fagone et al. | 726/22 |
| 2008/0109473 | A1* | 5/2008 | Dixon et al. | 707/102 |
| 2008/0114709 | A1* | 5/2008 | Dixon et al. | 706/13 |
| 2008/0163370 | A1* | 7/2008 | Maynard | 726/22 |
| 2009/0178142 | A1* | 7/2009 | Lieblich et al. | 726/25 |
| 2009/0300774 | A1* | 12/2009 | Makkinejad | 726/27 |
| 2009/0307771 | A1* | 12/2009 | Rajan et al. | 726/22 |
| 2010/0042931 | A1* | 2/2010 | Dixon et al. | 715/738 |
| 2010/0118717 | A1* | 5/2010 | Suzuki et al. | 370/252 |

OTHER PUBLICATIONS

Graham, "A Plan for Spam", *Hackers& Painters*, Aug. 2002, pp. 1-13 [online]. Retrieved on Dec. 11, 2009 from the Internet: <URL:http://www.paulgraham.com/spam.html>.

"SpamAssassin Configuration Manager", 2009, Parallels Holdings, pp. 1-5 [online]. Retrieved on Dec. 11, 2009 from the Internet: <URL:http://www.psoft.net/HSdocumentation/admin/spam_assassin.html>.

* cited by examiner

*Primary Examiner* — Haresh N Patel
(74) *Attorney, Agent, or Firm* — Gunnison, McKay & Hodgson, L.L.P.; Philip McKay

(57) ABSTRACT

A method and apparatus for identifying scam e-mails using phone number analysis whereby a set of potential scam e-mail identification rules is created and data representing the potential scam e-mail identification rules is stored in a data storage device. Incoming e-mails are then scanned under the direction of one or more processors by an e-mail security system to detect phone numbers present in the incoming e-mails using one or more phone number detection parameters. Any potential phone numbers detected using the one or more phone number detection parameters are then normalized. In one embodiment, the normalized potential phone numbers are then analyzed using the potential scam e-mail identification rules to identify potential scam phone numbers. The e-mails including the identified potential scam phone numbers then have their status transformed to that of potential scam e-mails.

20 Claims, 4 Drawing Sheets

METHOD AND SYSTEM FOR EMPLOYING PHONE NUMBER ANALYSIS TO DETECT AND PREVENT SPAM AND E-MAIL SCAMS

BACKGROUND OF THE INVENTION

One major problem facing modern computing systems and communications systems is the prevalence of spam and/or scam electronic mail (e-mail) that includes malicious, unwanted, offensive, or nuisance content, such as, but is not limited to: any content that promotes and/or is associated with fraud; any content that includes "work from home" or "be our representative" offers/scams; any content that includes money laundering or so-called "mule spam"; any content that promotes and/or is associated with various financial scams; any content that promotes and/or is associated with any other criminal activity; and/or any content that promotes and/or is associated with harmful and/or otherwise undesirable content, whether illegal in a given jurisdiction or not.

One particularly troublesome, and at times dangerous, form of scam e-mail is the so called "Nigerian 419" spam e-mail. A typical Nigerian 419 e-mail is a form of advance-fee fraud in which the target is persuaded to advance sums of money in the hope of realizing a significantly larger gain. The number "419" refers to the article of the Nigerian Criminal Code (part of Chapter 38: "Obtaining Property by false pretences; Cheating") dealing with fraud. However, as discussed below, Nigerian 419 scams are a global issue and problem.

Although similar to older scams such as the Spanish Prisoner, the modern Nigerian 419 scam originated in the early 1980s as the oil-based Nigerian economy declined. Several unemployed university students first used this scam as a means of manipulating business visitors interested in shady deals in the Nigerian oil sector before targeting businessmen in the west, and later the wider population. Scammers in the early-to-mid 1990s targeted companies, sending scam messages via letter, fax, or Telex. The spread of e-mail and easy access to e-mail-harvesting software significantly lowered the cost of sending scam letters by using the Internet. In the 2000s, the Nigerian 419 scam has spurred imitations from other locations in Africa, Asia and Eastern Europe, and, more recently, from North America, Western Europe (mainly UK), and Australia, the latter three mainly done by Africans. Consequently, currently, Nigerian 419 scams are a global issue.

A Nigerian 419 scam usually begins with an e-mail purportedly sent to a selected recipient but actually sent to many, making an offer that would result in a large payoff for the victim. The e-mail's subject line often says something like "From the desk of Mr. [Name]", "Your assistance is needed", and so on. The details vary, but the usual story is that a person, often a government or bank employee, knows of a large amount of unclaimed money or gold which he cannot access directly, usually because he has no right to it. The sums involved are usually in the millions of dollars, and the investor is promised a large share, typically ten to forty percent, if they assist the scam character in retrieving the money. Whilst the vast majority of recipients do not respond to these e-mails, a very small percentage do, but this is often enough to make the fraud worthwhile as many millions of messages can be sent. Invariably sums of money which are substantial, but very much smaller than the promised profits, are said to be required in advance for bribes, fees, etc. This is the money being stolen from the victim, who thinks he or she is investing to make a huge profit.

A Nigerian 419 scammer often introduces a delay or monetary hurdle that prevents the deal from occurring as planned, such as "To transmit the money, we need to bribe a bank official. Could you help us with a loan?" or "For you to be a party to the transaction, you must have holdings at a Nigerian bank of $100,000 or more" or some similar request. More delays and more additional costs are then added, always keeping the promise of an imminent large transfer alive, convincing the victim that the money they are currently paying is covered several times over by the payoff. However, the essential fact in all advance-fee fraud operations, such as a Nigerian 419 scam, is that the promised money transfer never happens because the money or gold does not exist. The perpetrators rely on the fact that, by the time the victim realizes this, the victim may have sent thousands of dollars of their own money, and sometimes thousands or millions more that has been borrowed or stolen, to the scammer via an untraceable and/or irreversible means such as wire transfer.

Since Nigerian 419 scammers often make use of low-volume and/or hand written e-mail messages, identifying Nigerian 419 scam e-mails and quarantining them is often quite difficult. However, many Nigerian 419 scam e-mails include one or more real telephone numbers that are included to provide the recipient/victim a mechanism for responding to the e-mail and/or to provide a veil of legitimacy to the e-mail. These phone numbers are typically more scarce and more difficult to obtain than an e-mail address so a given phone number is often associated with multiple Nigerian 419 e-mails. Consequently, in theory, the fact that Nigerian 419 e-mails often include these phone numbers could be used to identify potential Nigerian 419 e-mails and prevent them from being delivered and/or propagated.

However, attempts to identify Nigerian 419 e-mails based on the presence of phone numbers are particularly susceptible to "false positives", i.e., unnecessary delays and analysis of legitimate e-mails. Indeed any attempt to isolate and analyze all e-mails containing phone numbers obviously would result in far more false positives than actual instances of preventing the propagation of real Nigerian 419 e-mails. In addition, given that many e-mails include numerous instances of numbers other than phone numbers, such as dates, times, message IDs etc., there is again potential for far more false positives than actual instances of identifying real Nigerian 419 e-mails. Finally, many perpetrators of Nigerian 419 e-mail scams now specifically try to hide phone numbers from any conventional internet and/or e-mail security systems by, for example: adding or deleting country codes, international access codes, characters and/or spaces; intentionally misspelling words; and/or various other, and seemingly ever-evolving, obfuscation techniques.

As a result of the situation described above, currently, Nigerian 419 e-mails are extremely difficult to identify and isolate and, therefore, many of these harmful, and at times dangerous, e-mails still find their way to thousands of victims each year. Clearly, this is a far from ideal situation for the victims, but it is also a problem for all users of e-mail who must suffer with the delays of false positives and/or must be wary of all e-mails, even those of legitimate origin and intent.

SUMMARY

According to one embodiment of a method and apparatus for identifying scam e-mails using phone number analysis, a set of potential scam e-mail identification rules is created and data representing the potential scam e-mail identification rules is stored in a data storage device under the direction of one or more processors. In one embodiment, incoming e-mails are scanned under the direction of one or more processors by an e-mail security system associated with one or more computing systems to detect phone numbers present in the incoming e-mails using one or more phone number detection parameters. In one embodiment, any potential phone numbers detected using the one or more phone number detection parameters are normalized under the direction of one or more processors. In one embodiment, the normalized potential phone numbers are then analyzed using the potential scam e-mail identification rules and the potential scam e-mail identification rules data are applied to identify potential scam e-mails. In one embodiment, the identified potential scam e-mails are then subjected to one or more protective measures including, but not limited to, blocking, quarantining, further analysis, labeling and/or tagging, redirection to a specific address and/or location for further processing, buffering, or any other protective measures discussed herein, and/or as known in the art at the time of filing, and/or as developed after the time of filing. In one embodiment, the phone numbers detected in the identified potential scam e-mails are also added to a scam e-mail detection database and/or are used to create new potential scam e-mail identification rules.

In one embodiment, at least some of the potential scam e-mail identification rules are based on numbering systems, plans, and/or sequences assigned by phone service companies and/or telecommunication regulators such as, but not limited to, the Federal Communications Commission (FCC) in the United States, the Office Of Communications (OFCOM) in the United Kingdom, and/or the International Telecommunications Union (ITU), that can uniquely identify various parameters associated with a given phone number such as the location of the phone associated with the phone number and data regarding the type of phone system associated with the phone number.

In one embodiment, the set of potential scam e-mail identification rules created includes, but is not limited to, any one or more of the following: one or more rules requiring that e-mails including phone numbers indicating a defined suspicious country of origin, such as Nigeria, be subjected to one or more protective measures; one or more rules requiring that e-mails including phone numbers indicating a defined suspicious area of origin within a country, such as New York, be subjected to one or more protective measures; one or more rules requiring that e-mails including phone numbers indicating a defined phone type, such as phone numbers associated with mobile phones as opposed to land-line phones, be subjected to one or more protective measures; one or more rules requiring that e-mails including phone numbers of a defined type, such as a forwarding phone number, a personal phone number, a Voice Over IP phone number, or any other phone number that can easily be re-directed, be subjected to one or more protective measures; one or more rules requiring that e-mails including specific known scam phone numbers, or number sequences, be subjected to one or more protective measures; one or more rules requiring that e-mails including phone numbers and defined text such as "money", "lottery", "help", etc. be subjected to one or more protective measures; and/or any other potential scam e-mail identification rules desired by the provider of the method and apparatus for identifying scam e-mails using phone number analysis and/or one or more users of the method and apparatus for identifying scam e-mails using phone number analysis.

In one embodiment, the data representing the potential scam e-mail identification rules is stored in a security system provider computing system memory in a memory location associated with the method and apparatus for identifying scam e-mails using phone number analysis or in another memory device and/or database, under the control of, and/or otherwise associated with, the security system provider computing system memory and/or a process for identifying scam e-mails using phone number analysis.

In one embodiment, the data representing the potential scam e-mail identification rules is stored, in whole, or in part, in any memory system, in any computing system and/or server system, or other device, in another location, or on/in a computer readable medium, and/or any other computer program product. In one embodiment, at least part of the data representing the potential scam e-mail identification rules is stored, in whole, or in part, on a webpage, in a web-based system on a network.

In one embodiment, incoming e-mails are scanned to detect phone numbers present in the incoming e-mails using one or more phone number detection parameters. In one embodiment, incoming e-mails are scanned using one or more phone number detection parameters under the direction of one or more processors by an e-mail security system associated with one or more security system provider computing systems before the incoming e-mails are passed to a given user computing system.

In one embodiment, incoming e-mails are scanned to detect phone numbers present in the incoming e-mails using one or more phone number detection parameters under the direction of one or more processors by an e-mail security system associated with one or more user computing systems that scan any incoming e-mails to the given user computing system.

In one embodiment, the one or more phone number detection parameters include, but are not limited to, one or more of the following: the presence of international prefixes and/or area codes; the presence of keywords, text, or phrases, and/or punctuation, such as "call", "call me", "phone", "fon", "telephone", "Tel::, "Tel-", "(Tel)", etc., in a given language, followed by numbers; the presence of a defined number of numbers; defined formatting of numbers; and/or any other phone number detection parameters desired by the provider of the method and apparatus for identifying scam e-mails using phone number analysis.

In one embodiment, any potential phone numbers detected using the one or more phone number detection parameters are normalized and condensed into a "raw" sequence of numbers under the direction of one or more processors such that all non-essential symbols are removed, and/or all empty spaces are removed, and/or defined initial numbers, such as an initial "0", are removed.

In one embodiment, the normalized potential phone numbers are then analyzed using the potential scam e-mail identification rules data and the potential scam e-mail identification rules are applied to identify potential scam e-mails. For instance, in one embodiment, e-mails including normalized potential phone numbers indicating a defined suspicious country of origin, such as Nigeria, are labeled as potential scam e-mails. As another example, in one embodiment, e-mails including normalized potential phone numbers indicating a defined suspicious area of origin within a country, such as New York, are labeled as potential scam e-mails while e-mails including normalized potential phone numbers including phone numbers in a defined safe area, such as Washington D.C., are labeled as probable legitimate e-mails. As another example, in one embodiment, e-mails including normalized potential phone numbers indicating a defined phone type, such as normalized potential phone numbers associated with mobile phones, are labeled as potential scam e-mails while e-mails including normalized potential phone numbers including phone numbers associated with land-line phones are labeled as probable legitimate e-mails. As another example, in one embodiment, e-mails including normalized potential phone numbers indicating a defined phone number type, such as a forwarding number, personal phone number, Voice Over IP numbers, or any other number that can easily be re-directed, are labeled as potential scam e-mails. As another example, in one embodiment, e-mails including normalized potential phone numbers known to be scam phone numbers, or containing known scam phone number sequences, are labeled as potential scam e-mails. As another example, in one embodiment, e-mails including normalized potential phone numbers and defined text and/or terms such as "money", "lottery", "help", etc. are labeled as potential scam e-mails. In various other embodiments, the normalized potential phone numbers are analyzed using any other potential scam e-mail identification rules desired by the provider of the method and apparatus for identifying scam e-mails using phone number analysis the and/or one or more users of the method and apparatus for identifying scam e-mails using phone number analysis.

In one embodiment, the identified potential scam e-mails are subjected to one or more protective measures and/or further analyzed by the provider of the method and apparatus for identifying scam e-mails using phone number analysis and/or one or more users of the method and apparatus for identifying scam e-mails using phone number analysis are asked to provide input regarding the identified potential scam e-mails. Herein, the term "protective measure" includes, but not limited to blocking, quarantining, further analysis, labeling and/or tagging, redirection to a specific address and/or location for further processing, buffering, or any other protective measure discussed herein, and/or as known in the art at the time of filing, and/or as developed after the time of filing.

In one embodiment, the phone numbers detected in the identified potential scam e-mails are also added to a scam e-mail detection database and/or are used to create new potential scam e-mail identification rules and/or modify existing potential scam e-mail identification rules.

Using the method and system for identifying scam e-mails using phone number analysis, as discussed herein, Nigerian 419 e-mails can be reliably identified, based on the presence of phone numbers, using one or more potential scam e-mail identification rules that avoid large numbers of false positives and unnecessary delays and analysis of legitimate e-mails. In addition, the method and system for identifying scam e-mails using phone number analysis, as discussed herein, uses one or more phone number detection parameters to avoid analysis and false positive events based on numbers other than phone numbers, such as dates, times, message IDs etc. In addition, by using one or more phone number detection parameters and potential scam e-mail identification rules, and/or modifying the one or more phone number detection parameters and potential scam e-mail identification rules, the method and system for identifying scam e-mails using phone number analysis, as discussed herein, makes it much harder for perpetrators of Nigerian 419 e-mail scams to hide phone numbers by: adding or deleting country codes, international calling access codes, characters and/or spaces; intentionally misspelling words; and/or various other, and seemingly ever-evolving, obfuscation techniques.

As a result, using the method and system for identifying scam e-mails using phone number analysis, as discussed herein, far more of these harmful, and at times dangerous, e-mails can be identified and stopped than is possible using currently available methods and systems.

Figure 1:
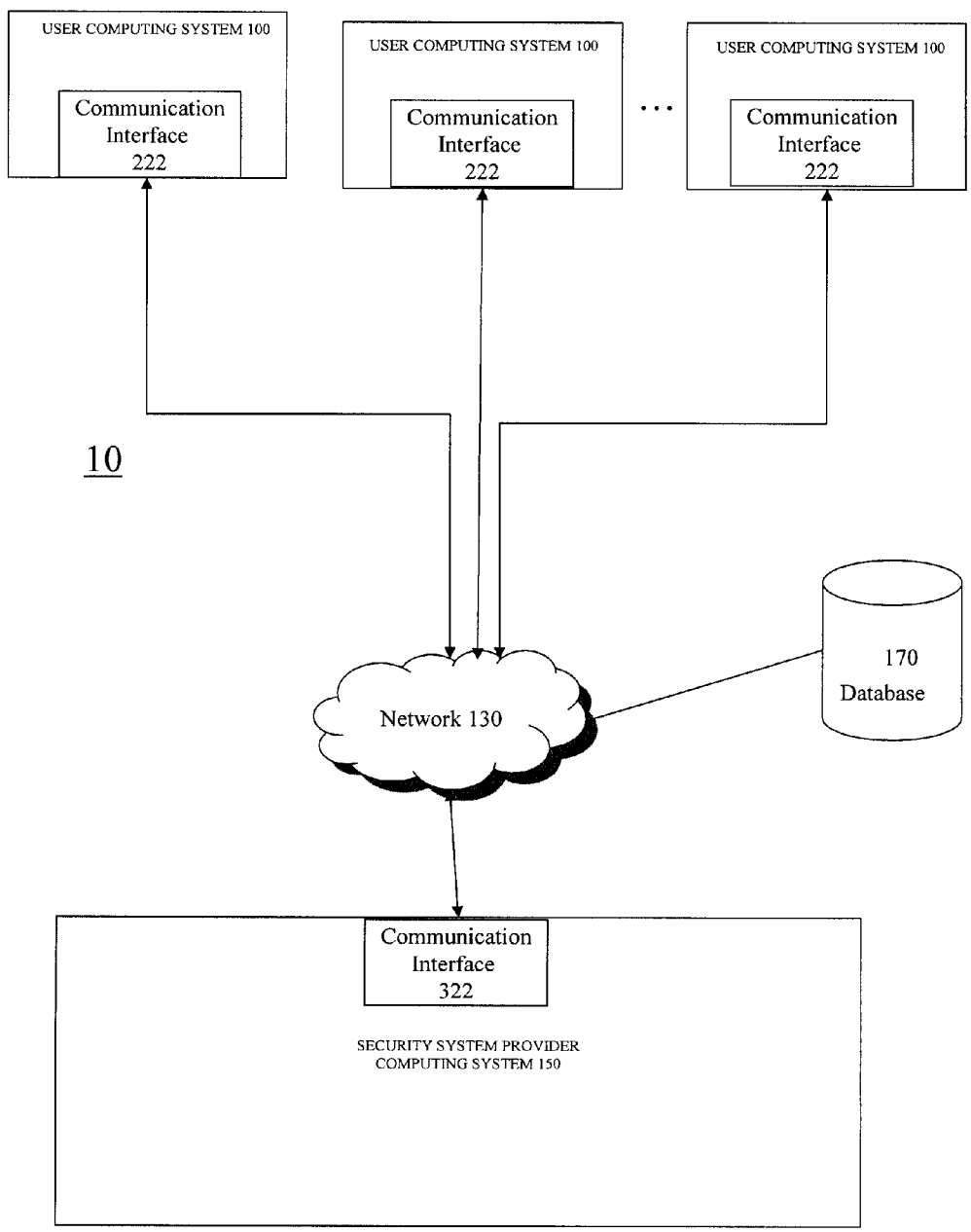
FIG. 1 is a block diagram of an exemplary hardware architecture for implementing one embodiment including user computing systems, a communication network, a database, and a security system provider computing system, in accordance with one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. The following description includes reference to specific embodiments for illustrative purposes. However, the illustrative discussion below is not intended to be exhaustive or to limit the invention to the precise forms disclosed. Many modifications and variations are possible in view of the teachings below. The embodiments discussed below were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below.

According to one embodiment of a method and apparatus for identifying scam e-mails using phone number analysis, a set of potential scam e-mail identification rules is created and data representing the potential scam e-mail identification rules is stored in a data storage device under the direction of one or more processors. In one embodiment, incoming e-mails are scanned under the direction of one or more processors by an e-mail security system associated with one or more computing systems to detect phone numbers present in the incoming e-mails using one or more phone number detection parameters. In one embodiment, any potential phone numbers detected using the one or more phone number detection parameters are normalized and condensed into a sequence of numbers under the direction of one or more processors. In one embodiment, the normalized potential phone numbers are then analyzed using the potential scam e-mail identification rules and the potential scam e-mail identification rules are applied to identify potential scam e-mails. In one embodiment, the identified potential scam e-mails are subjected to one or more protective measures and/or further analyzed. In one embodiment, the phone numbers detected in the identified potential scam e-mails are also added to a scam e-mail detection database and/or are used to create new potential scam e-mail identification rules.

FIG. 1 shows a block diagram of an exemplary hardware system 10 suitable for implementing one embodiment of a process for identifying scam e-mails using phone number analysis, such as exemplary process 400 of FIG. 4 discussed below. Returning to FIG. 1, exemplary hardware system 10 includes: one or more user computing system(s) 100, including communication interface(s) 222; security system provider computing system 150, including communication interface 322; and database 170; all communicating via communication interfaces 222 and 322 and network 130.

In one embodiment, one or more of user computing system(s) 100 are client computing systems. In one embodiment, one or more of user computing system(s) 100 are server computing systems that are, in turn, associated with one or more client computing systems. In one embodiment, one or more of user computing system(s) 100 are representative of multiple user computing systems. In one embodiment, one or more of user computing system(s) 100 are part of a cloud computing environment. In one embodiment, user computing system(s) 100 are used, and/or are accessible, by another computing system, such as security system provider computing system 150 (discussed below) or any one or more of other user computing system(s) 100.

As used herein, the term "computing system", such as is included in the terms "user computing system" and "security system provider computing system" includes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In various embodiments, user computing system(s) 100 can be any computing system as defined herein and/or as known in the art at the time of filing and/or as developed thereafter, that includes components that can execute all, or part, of a process for identifying scam e-mails using phone number analysis in accordance with at least one of the embodiments as described herein. A more detailed discussion of user computing system(s) 100 is provided below with respect to FIG. 2.

Returning to FIG. 1, in one embodiment, security system provider computing system 150 is any computing system as defined herein and/or as known in the art at the time of filing and/or as developed thereafter, that includes components that can execute all, or part, of a process for identifying scam e-mails using phone number analysis in accordance with at least one of the embodiments as described herein and is accessible by, controlled by, and/or otherwise associated with, a security system provider. As used herein, a security system provider includes, but is not limited to, any party, person, application, system, or entity that desires to identify and block the transmission of spam and/or scam e-mails.

In one embodiment, security system provider computing system 150 is representative of two or more security system provider computing systems. In one embodiment, security system provider computing system 150 is a client computing system associated with one or more server computing systems. In one embodiment, security system provider computing system 150 is a server computing system that is, in turn, associated with one or more client computing systems that are users of one more security systems provided through, or monitored by, the security system provider associated with security system provider computing system 150. In one embodiment, security system provider computing system 150 is part of a cloud computing environment. A more detailed discussion of security system provider computing system 150 is provided below with respect to FIG. 3.

Also shown in FIG. 1 is database 170. In one embodiment, database 170 is a data storage device, a designated server system or computing system, or a designated portion of one or more server systems or computing systems, such as computing system(s) 100 and/or security system provider computing system 150, or a distributed database, or an external and/or portable hard drive. In one embodiment, database 170 is a dedicated mass storage device implemented in software, hardware, or a combination of hardware and software. In one embodiment, database 170 is a web-based function. As discussed in more detail below, in one embodiment, database 170 is under the control of, or otherwise accessible by, a process for identifying scam e-mails using phone number analysis, and/or a provider of a security system and/or a security system provider computing system 150. In one embodiment, database 170 is part of a cloud computing environment.

In one embodiment, computing system(s) 100, security system provider computing system 150, and database 170, are coupled through network 130. In various embodiments, network 130 is any network, communications network, or network/communications network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, as discussed herein, and/or available or known at the time of filing, and/or as developed after the time of filing.

In one embodiment, computing system(s) 100, security system provider computing system 150, and database 170, are coupled in a cloud computing environment.

Figure 2:
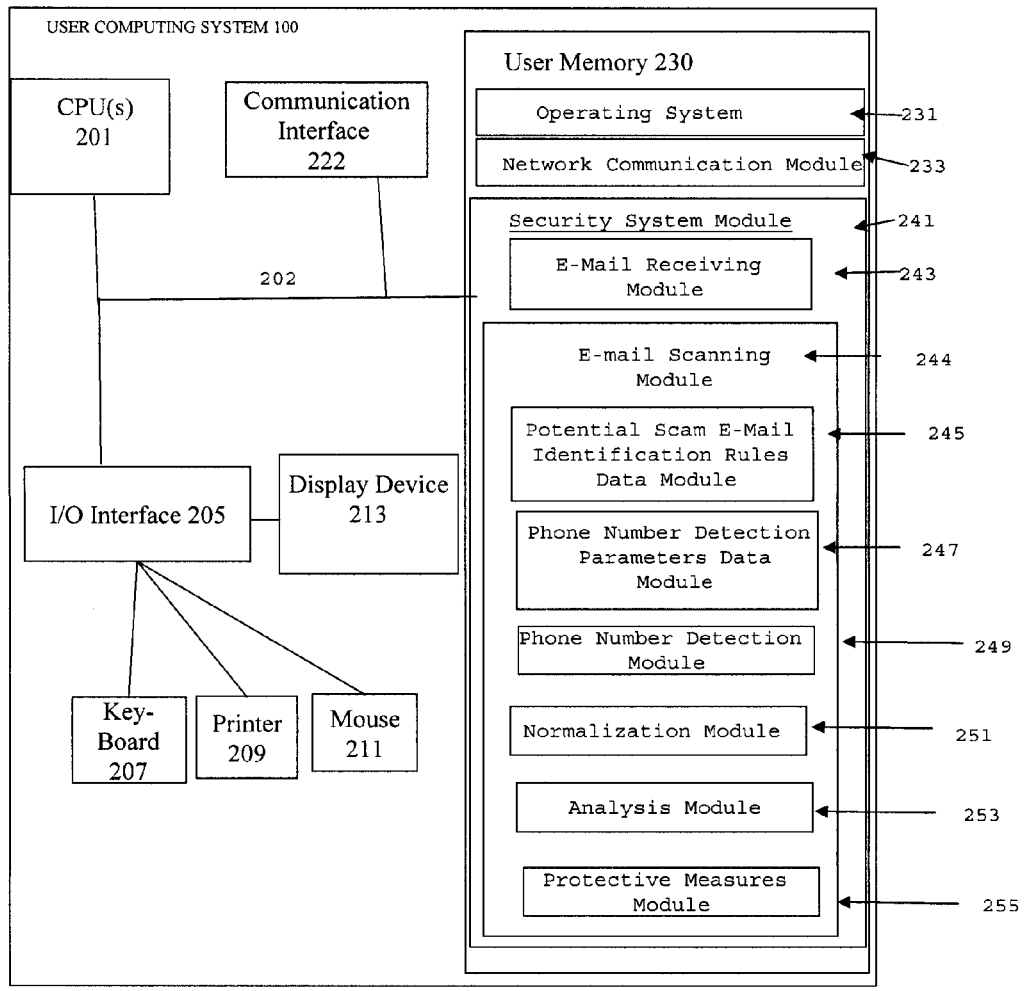
FIG. 2 is a block diagram of an exemplary user computing system of FIG. 1, in accordance with one embodiment.

FIG. 2 is a more detailed block diagram of an exemplary user computing system(s) 100. As seen in FIG. 2, in one embodiment, user computing system(s) 100 include(s) one or more Central Processing Unit(s), CPU(s) 201; user memory 230; at least one communication interface 222; an Input/Output interface, I/O interface 205, including one or more user interface devices such as display device 213, keyboard 207, printer 209, and/or mouse 211; all interconnected by one or more communication buses 202.

As also seen in FIG. 2, in one embodiment, user memory 230 can store data and/or instructions associated with, but not limited to, the following elements, subsets of elements, and/or super sets of elements for processing by one or more processors, such as CPU(s) 201 (FIG. 2) and/or 301 (FIG. 3): operating system 231 that includes procedures, data, and/or instructions for handling various services and performing/coordinating hardware dependent tasks; network communications module 233 that includes procedures, data, and/or instructions for, along with communication interface 222, connecting user computing system(s) 100 to other computing systems, such as other user computing system(s) 100 and/or security system provider computing system 150 of FIG. 1, and/or a network, such as network 130 of FIG. 1, and/or a database, such as database 170 of FIG. 1; and security system module 241 (FIG. 2) that includes procedures, data, and/or instructions, for intercepting and/or analyzing e-mails being sent to, or through, user computing system(s) 100 and/or security system provider computing system 150 of FIG. 1 to identify spam and/or scam e-mails and to take one or more protective measures.

As also seen in FIG. 2, in one embodiment, security system module 241 of user memory 230 includes: e-mail receiving module 243 that includes procedures, data, and/or instructions for receiving e-mails sent to user computing system(s) 100 via communication interface 222 and/or security system provider computing system 150 of FIG. 1; and e-mail scanning module 244 that includes procedures, data, and/or instructions for scanning e-mails being sent to, or through, user computing system(s) 100 and/or security system provider computing system 150 of FIG. 1 to identify spam and/or scam e-mails and to take one or more protective measures.

As also seen in FIG. 2, in one embodiment, e-mail scanning module 244 includes potential scam e-mail identification rules data module 245 that includes procedures, data, and/or instructions, for creating and storing potential scam e-mail identification rules data; phone number detection parameters data module 247 (FIG. 2) that includes procedures, data, and/or instructions, for storing phone number detection parameters data; phone number detection module 249 that includes procedures, data, and/or instructions, for scanning incoming e-mails to detect phone numbers present in the incoming e-mails; normalization module 251 that includes procedures, data, and/or instructions, for normalizing any potential phone numbers detected at phone number detection module 249; analysis module 253 that includes procedures, data, and/or instructions for analyzing the normalized potential phone numbers of normalization module 251 using the potential scam e-mail identification rules data of potential scam e-mail identification rules data module 245; and protective measures module 255 that includes procedures, data, and/or instructions for subjecting potential scam e-mails identified at analysis module 253 to one or more protective measures, including, but not limited to blocking, quarantining, further analysis, labeling and/or tagging, redirection to a specific address and/or location for further processing, buffering, or any other protective measure discussed herein, and/or as known in the art at the time of filing, and/or as developed after the time of filing.

Those of skill in the art will readily recognize that the choice of components, data, modules, and information shown in FIG. 2, the organization of the components, data, modules, and information shown in FIG. 2, and the manner of storage and location of storage of the data, modules, and information shown in FIG. 2 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 2 are illustrative only and not limiting. In various other embodiments, the particular modules and/or data shown in FIG. 2 can be grouped together in fewer modules and/or data locations or divided among more modules and/or data locations. Consequently, those of skill in the art will recognize that other orders and/or grouping are possible and the particular modules and/or data, order, and/or grouping shown in FIG. 2 discussed herein do not limit the scope as claimed below.

A more detailed discussion of the operation of exemplary user computing system(s) 100, user memory 230, and security system module 241 of user memory 230, is provided below with respect to FIG. 4.

Figure 3:
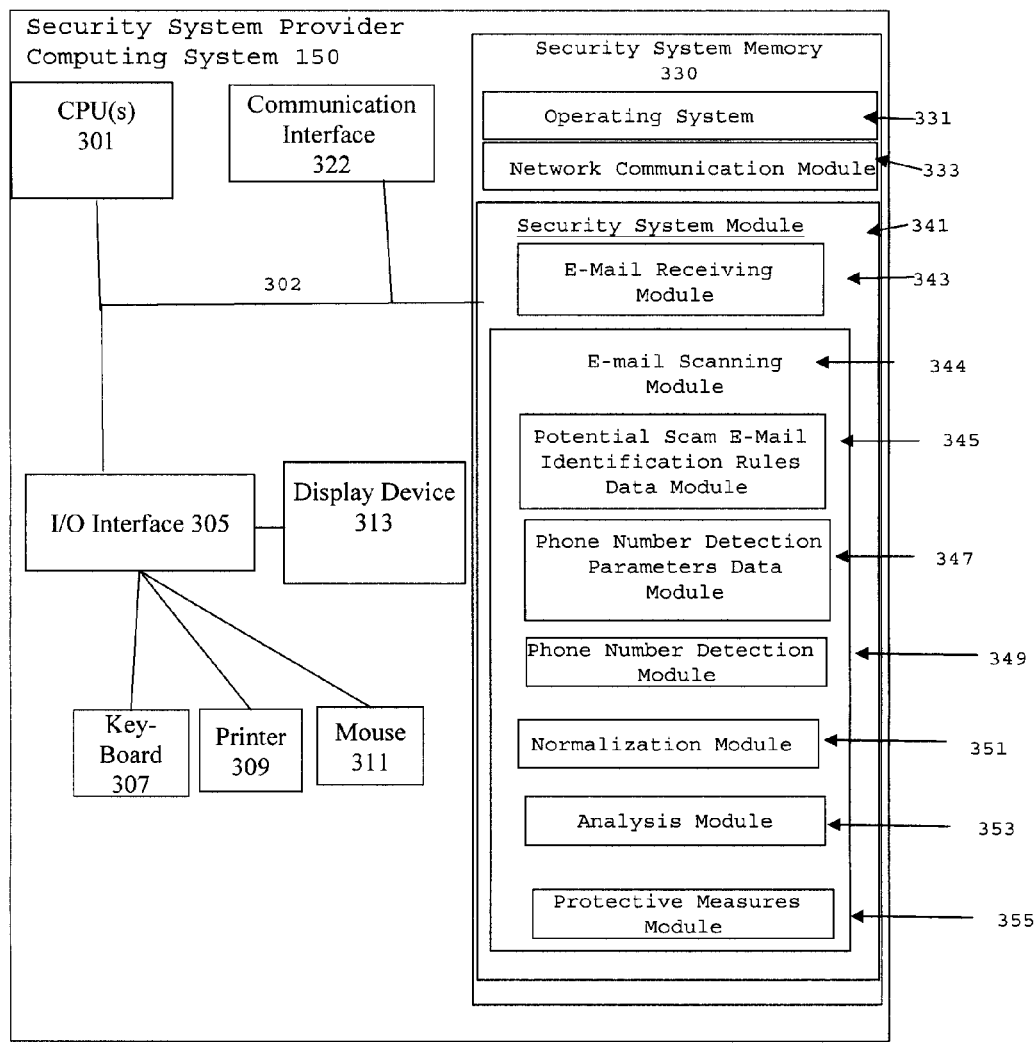
FIG. 3 is a block diagram of an exemplary security system provider computing system of FIG. 1, in accordance with one embodiment.

FIG. 3 is a more detailed block diagram of an exemplary security system provider computing system 150. As seen in FIG. 3, in one embodiment, security system provider computing system 150 includes one or more Central Processing Unit(s), CPU(s) 301; security system memory system 330; at least one communication interface 322; an Input/Output interface, I/O interface 305, including one or more user interface devices such as display device 313, keyboard 307, printer 309, and/or mouse 311; all interconnected by one or more communication buses 302.

As also seen in FIG. 3, in one embodiment, security system memory system 330 can store data and/or instructions associated with, but not limited to, the following elements, subsets of elements, and/or super sets of elements for use in processing by one or more processors, such as CPU(s) 201 (FIG. 2) and/or 301 (FIG. 3): operating system 331 that includes procedures, data, and/or instructions for handling various services and performing/coordinating hardware dependent tasks; network communications module 333 that includes procedures, data, and/or instructions, for, along with communication interface 322, connecting security system provider computing system 150 to other computing systems, such as user computing system(s) 100 and/or another security system provider computing system, and/or a network, such as network 130 of FIG. 1, and/or a database, such as database 170 of FIG. 1; and e-mail scanning module 344 that includes procedures, data, and/or instructions for scanning e-mails being sent to, or through, user computing system(s) 100 and/or security system provider computing system 150 of FIG. 1 to identify spam and/or scam e-mails and to take one or more protective measures.

As also seen in FIG. 3, in one embodiment, e-mail scanning module 344 includes potential scam e-mail identification rules data module 345 that includes procedures, data, and/or instructions, for creating and storing potential scam e-mail identification rules data; phone number detection parameters data module 347 (FIG. 3) that includes procedures, data, and/or instructions, for storing phone number detection parameters data; phone number detection module 349 that includes procedures, data, and/or instructions, for scanning incoming e-mails to detect phone numbers present in the incoming e-mails; normalization module 351 that includes procedures, data, and/or instructions, for normalizing any potential phone numbers detected at phone number detection module 349; analysis module 353 that includes procedures, data, and/or instructions for analyzing the normalized potential phone numbers of normalization module 351 using the potential scam e-mail identification rules data of potential scam e-mail identification rules data module 345; and protective measures module 355 that includes procedures, data, and/or instructions for subjecting potential scam e-mails identified at analysis module 353 to one or more protective measures, including, but not limited to blocking, quarantining, further analysis, labeling and/or tagging, redirection to a specific address and/or location for further processing, buffering, or any other protective measure discussed herein, and/or as known in the art at the time of filing, and/or as developed after the time of filing.

Those of skill in the art will readily recognize that the choice of components, data, modules, and information shown in FIG. 3, the organization of the components, data, modules, and information shown in FIG. 3, and the manner of storage and location of storage of the data, modules, and information shown in FIG. 3 was made for illustrative purposes only and that other choices of components, data, modules, and information, organization of the components, data, modules, and information, manner of storing, and location of storage, of the data, modules, and information can be implemented without departing from the scope of the invention as set forth in the claims below. In particular, the various modules and/or data shown in FIG. 3 are illustrative only and not limiting. In various other embodiments, the particular modules and/or data shown in FIG. 3 can be grouped together in fewer modules and/or data locations or divided among more modules and/or data locations. Consequently, those of skill in the art will recognize that other orders and/or grouping are possible and the particular modules and/or data, order, and/or grouping shown in FIG. 3 discussed herein do not limit the scope as claimed below.

A more detailed discussion of the operation of exemplary security system provider computing system 150, security system memory system 330, security system module 334 of security system memory system 330, and user data module 343 of security system memory system 330 is provided below with respect to FIG. 4.

Figure 4:
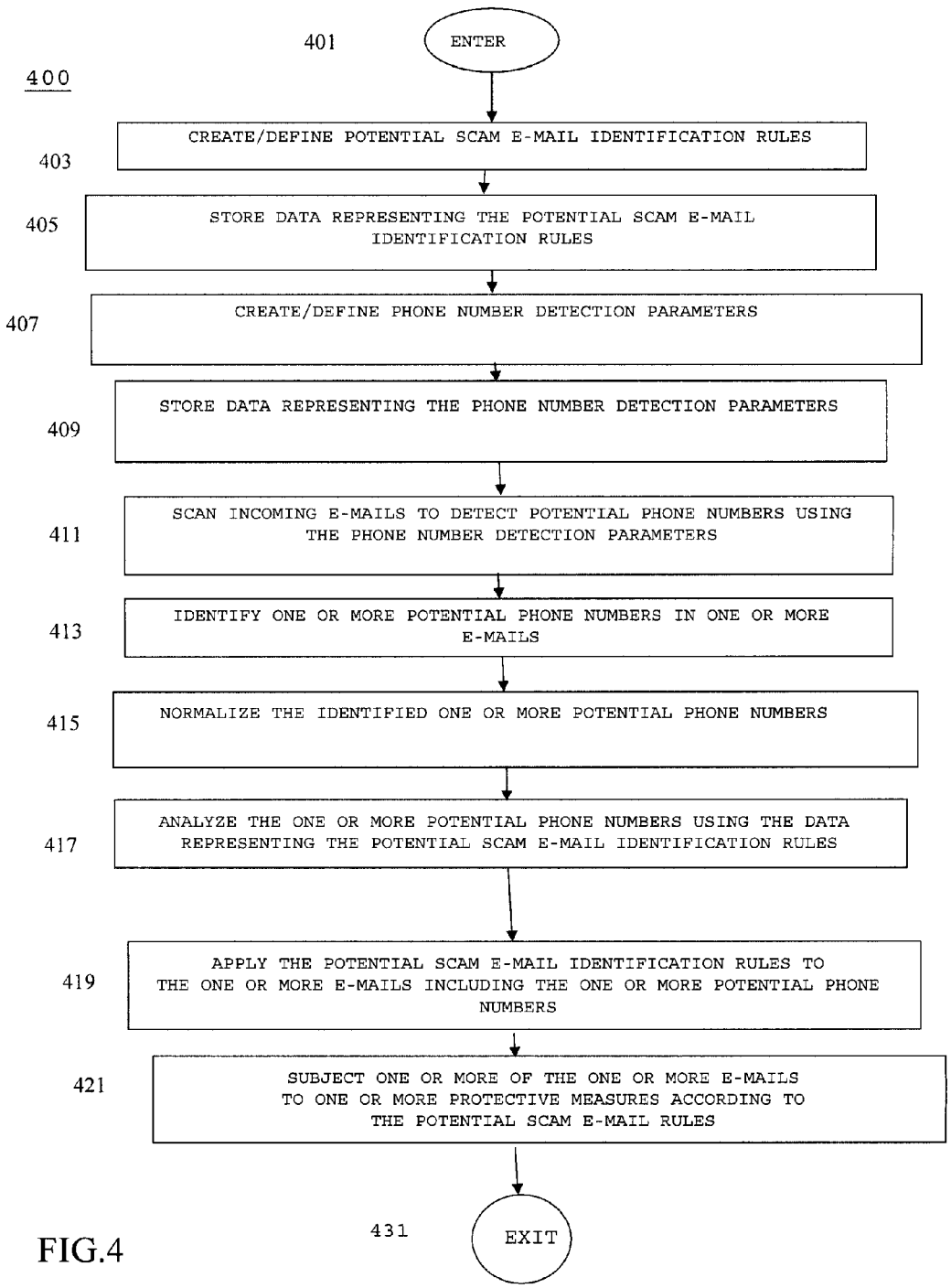
FIG. 4 is a flow chart depicting a process for identifying scam e-mails using phone number analysis in accordance with one embodiment.

FIG. 4 is a flow chart depicting a process for identifying scam e-mails using phone number analysis 400 in accordance with one embodiment.

Process for identifying scam e-mails using phone number analysis 400 begins at ENTER OPERATION 401 and process flow proceeds to CREATE/DEFINE POTENTIAL SCAM E-MAIL IDENTIFICATION RULES OPERATION 403.

In one embodiment, at CREATE/DEFINE POTENTIAL SCAM E-MAIL IDENTIFICATION RULES OPERATION 403 a set of potential scam e-mail identification rules is created.

In one embodiment, at CREATE/DEFINE POTENTIAL SCAM E-MAIL IDENTIFICATION RULES OPERATION 403 at least some of the potential scam e-mail identification rules are based on numbering systems, plans, and/or sequences assigned by phone service companies and/or telecommunication regulators such as, but not limited to, the Federal Communications Commission (FCC) in the United States, the Office Of Communications (OFCOM) in the United Kingdom, and/or the International Telecommunications Union (ITU), that can uniquely identify various parameters associated with a given phone number such as the location of the phone associated with the phone number and data regarding the type of phone system associated with the phone number.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including phone numbers indicating a defined suspicious country of origin be subjected to one or more protective measures. In this way, e-mails containing potential phone numbers from a given country known to be a source of scam e-mails can be subjected to one or more protective measures. As an example, in one embodiment, an e-mail containing a phone number associated with any part of Nigeria, or any other country that generates a large volume of scam e-mails, is automatically subjected to one or more protective measures such as, but not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including phone numbers indicating a defined suspicious area of origin within a country be subjected to one or more protective measures. In this way, e-mails containing potential phone numbers from a given part of a country known to be a source of scam e-mails can be subjected to one or more protective measures such as, but not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing. As an example, in one embodiment, an e-mail containing a phone number associated with New York, N.Y., or any other city or state in the United States that generates a large volume of scam e-mails, is automatically be subjected to one or more protective measures while e-mails containing a phone number associated with another part of the United States are automatically considered legitimate.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including phone numbers associated with a defined phone type be subjected to one or more protective measures such as, but not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing. In this way, as a specific example, phone numbers associated with mobile phones can be subjected to one or more protective measures while those associated with land-lines are not, or vice-versa.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including phone numbers of a defined type, such as a forwarding phone number, a personal phone number, a Voice Over IP phone number, or any other phone number that can easily be re-directed, be subjected to one or more protective measures such as, but not limited to: blocking; quarantining; further analysis; labeling and/or tagging as spam/scam or potential spam/scam; redirection to a specific address and/ or location for further processing; buffering; or any other protective measure discussed herein, and/or as known in the art at the time of filing, and/or as developed after the time of filing. As a specific example, personal phone numbers, such as those having the prefix 4470 in the United Kingdom, may be subjected to one or more protective measures because these numbers can be readily relayed anywhere, while those having the prefix 447 indicating a mobile phone in the United Kingdom would not necessarily be subjected to one or more protective measures.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including specific known scam phone numbers, or number sequences, be subjected to one or more protective measures such as, but not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing. In this example a database of known scam phone numbers, or number sequences, can be used to identify and quarantine e-mails containing these known scam numbers.

In one embodiment, at CREATE/DEFINE POTENTIAL SCAM E-MAIL IDENTIFICATION RULES OPERATION 403 the set of potential scam e-mail identification rules created includes, but is not limited to, one or more rules requiring that e-mails including phone numbers and defined text such as "money", "lottery", "help", etc. be subjected to one or more protective measures such as, but not limited to: blocking; quarantining; further analysis; labeling and/or tagging as spam/scam or potential spam/scam; redirection to a specific address and/or location for further processing; buffering; or any other protective measure discussed herein, and/or as known in the art at the time of filing, and/or as developed after the time of filing. In this example, key words or phrases used in conjunction with potential phone numbers make a given e-mail suspect and results in the e-mail being subjected to one or more protective measures.

In one embodiment, at CREATE/DEFINE POTENTIAL SCAM E-MAIL IDENTIFICATION RULES OPERATION 403 the set of potential scam e-mail identification rules created includes, but is not limited to, one or more rules defining non-scam phone number sequences such as repeated digits generally associated with legitimate business phone networks. In these embodiments, the presence of the defined sequence of numbers and/or repeated digits is assumed to indicate a legitimate business and is therefore used to identify a given e-mail as a legitimate e-mail.

In various embodiments, at CREATE/DEFINE POTENTIAL SCAM E-MAIL IDENTIFICATION RULES OPERATION 403 the set of potential scam e-mail identification rules created includes, but is not limited to, any other potential scam e-mail identification rules desired by the provider of process for identifying scam e-mails using phone number analysis 400 and/or one or more users of process for identifying scam e-mails using phone number analysis 400.

In various embodiments, at CREATE/DEFINE POTENTIAL SCAM E-MAIL IDENTIFICATION RULES OPERATION 403 data representing the set of potential scam e-mail identification rules is entered into a computing system, such as user computing system(s) 100 of FIGS. 1 and 2 and/or a security system provider's computing system, such as security system provider computing system 150 of FIGS. 1 and 3 via one or more user interface devices such as, but not limited to, keyboards 207 and 307, mice 211 and 311, a touchpad, a touch screen, voice recognition and/or command software, or any other device for converting user actions into one or more computing system instructions as discussed herein, and/or as known in the art at the time of filing, and/or as developed after the time of filing.

In various embodiments, at CREATE/DEFINE POTENTIAL SCAM E-MAIL IDENTIFICATION RULES OPERATION 403 data representing the set of potential scam e-mail identification rules is entered into a security system used to monitor e-mails coming into, and/or through, a given computing system. In one embodiment, the security system is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in some embodiments, at least part of the data representing the set of potential scam e-mail identification rules resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail coming into, and/or through, the user computing system, such as user computing system(s) 100, and/or communicating with a security system provider computing system, such as security system provider computing system 150, of FIG. 1.

Returning to FIG. 4, in some embodiments, at least part of the data representing the set of potential scam e-mail identification rules resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail coming into, and/or through, the user computing system, such as user computing system(s) 100, and/or communicating with a security system provider computing system, such as security system provider computing system 150, of FIG. 1.

In one embodiment, once a set of potential scam e-mail identification rules is created at CREATE/DEFINE POTENTIAL SCAM E-MAIL IDENTIFICATION RULES OPERATION 403, process flow proceeds to STORE DATA REPRESENTING THE POTENTIAL SCAM E-MAIL IDENTIFICATION RULES OPERATION 405.

In one embodiment, at STORE DATA REPRESENTING THE POTENTIAL SCAM E-MAIL IDENTIFICATION RULES OPERATION 405 data representing at least part of the set of potential scam e-mail identification rules created at CREATE/DEFINE POTENTIAL SCAM E-MAIL IDENTIFICATION RULES OPERATION 403 is stored.

In one embodiment, at STORE DATA REPRESENTING THE POTENTIAL SCAM E-MAIL IDENTIFICATION RULES OPERATION 405 data representing at least part of the set of potential scam e-mail identification rules created at CREATE/DEFINE POTENTIAL SCAM E-MAIL IDENTIFICATION RULES OPERATION 403 is stored on a security system provider computing system, such as security system provider computing system 150 of FIGS. 1 and 3. As noted above, in some embodiments, the security system provider computing system includes a security system memory system, such as security system memory system 330 (FIG. 3), that includes a security system module, such as security system module 334 (FIG. 3), that includes a potential scam e-mail identification rules data module 345 that includes procedures, data, and/or instructions, for creating and storing potential scam e-mail identification rules data.

In one embodiment, at STORE DATA REPRESENTING THE POTENTIAL SCAM E-MAIL IDENTIFICATION RULES OPERATION 405 data representing at least part of the set of potential scam e-mail identification rules created at CREATE/DEFINE POTENTIAL SCAM E-MAIL IDENTIFICATION RULES OPERATION 403 is stored on a user computing system, such as user computing system 100 of FIGS. 1 and 2. As noted above, in some embodiments, the user computing system includes a user memory system, such as user memory system 230 (FIG. 2), that includes a security system module, such as security system module 234 (FIG. 2), that includes a potential scam e-mail identification rules data module 245 that includes procedures, data, and/or instructions, for creating and storing potential scam e-mail identification rules data.

In one embodiment, at STORE DATA REPRESENTING THE POTENTIAL SCAM E-MAIL IDENTIFICATION RULES OPERATION 405 data representing at least part of the set of potential scam e-mail identification rules created at CREATE/DEFINE POTENTIAL SCAM E-MAIL IDENTIFICATION RULES OPERATION 403 is stored, in whole, or in part, in any memory system, such as a user memory system, or server memory system, or a database, such as database 170, of FIG. 1, or in a cache memory, or in any main memory or mass memory, associated with any computing system. In one embodiment, data representing at least part of the set of potential scam e-mail identification rules created at CREATE/DEFINE POTENTIAL SCAM E-MAIL IDENTIFICATION RULES OPERATION 403 is stored, in whole, or in part, in any computing system and/or server system, or other device, in another location, or on/in a computer readable medium, and/or any other computer program product. In one embodiment, data representing at least part of the set of potential scam e-mail identification rules created at CREATE/DEFINE POTENTIAL SCAM E-MAIL IDENTIFICATION RULES OPERATION 403 is stored, in whole, or in part, on a webpage, in a web-based system on a network such as network 130 of FIG. 1. In one embodiment, data representing at least part of the set of potential scam e-mail identification rules created at CREATE/DEFINE POTENTIAL SCAM E-MAIL IDENTIFICATION RULES OPERATION 403 is stored, in whole, or in part, on a webpage, in a web-based system on a public network such as the Internet. In one embodiment, data representing at least part of the set of potential scam e-mail identification rules created at CREATE/DEFINE POTENTIAL SCAM E-MAIL IDENTIFICATION RULES OPERATION 403 is stored, in whole, or in part, on a private network.

In one embodiment, once data representing at least part of the set of potential scam e-mail identification rules created at CREATE/DEFINE POTENTIAL SCAM E-MAIL IDENTIFICATION RULES OPERATION 403 is stored at STORE DATA REPRESENTING THE POTENTIAL SCAM E-MAIL IDENTIFICATION RULES OPERATION 405, process flow proceeds to CREATE/DEFINE PHONE NUMBER DETECTION PARAMETERS OPERATION 407.

In one embodiment, at CREATE/DEFINE PHONE NUMBER DETECTION PARAMETERS OPERATION 407 one or more phone number detection parameters are defined, at least in part, to minimize the risk of false positive results.

In one embodiment, at CREATE/DEFINE PHONE NUMBER DETECTION PARAMETERS OPERATION 407 the one or more phone number detection parameters defined include, but are not limited to, the presence of international prefixes and/or area codes. For instance, in one example of one embodiment, the one or more phone number detection parameters includes detection of international telephone prefixes such as 011 in the United States or various country codes such as 44 for the United Kingdom. However, many scam e-mail perpetrators now routinely leave these prefixes off so this one phone number detection parameter is typically not sufficient in and of itself.

In one embodiment, at CREATE/DEFINE PHONE NUMBER DETECTION PARAMETERS OPERATION 407 the one or more phone number detection parameters defined include, but are not limited to, the presence of keywords, text, or phrases, and/or punctuation, such as "call", "call me", "phone", "fon", "telephone", "Tel:, "Tel-", "(Tel)", "phone:", "phone-", "(phone)", etc., in a given language, followed by numbers, followed by numbers. In this one example of one embodiment, even intentionally misspelled words like "fon" preceding a string of numbers can be used to identify a potential phone number. In addition, this particular phone number detection parameter can be modified relatively easily to adapt to changing conditions and scammer tricks.

In one embodiment, at CREATE/DEFINE PHONE NUMBER DETECTION PARAMETERS OPERATION 407 the one or more phone number detection parameters defined include, but are not limited to, the presence of a defined number of numbers. In this one example of one embodiment, a minimum, or maximum, number of numbers are required in sequence in order for the sequence of numbers to be considered a potential phone number. Consequently, dates, times, serial numbers and message identifications can be distinguished from potential phone numbers to further avoid false positive results.

In one embodiment, at CREATE/DEFINE PHONE NUMBER DETECTION PARAMETERS OPERATION 407 the one or more phone number detection parameters defined include, but are not limited to, various symbols, such as, but not limited to, a "+" symbol used to denote an international access code or other number assigned by a phone service provider the caller should dial before entering a country or location code. For example, an e-mail including a phone number for a phone in the United Kingdom might include a phone number starting "44". In this specific example, in order to call this phone in the United Kingdom, a user in the United States must dial 011 44 followed by the UK phone number. In this specific example the "+" symbol represents, or is a place marker for, "011".

In one embodiment, at CREATE/DEFINE PHONE NUMBER DETECTION PARAMETERS OPERATION 407 the one or more phone number detection parameters defined include, but are not limited to, defined punctuation with numbers such as parentheses encasing a defined number of numbers such as (408) indicating an area code in the United States.

In various embodiments, at CREATE/DEFINE PHONE NUMBER DETECTION PARAMETERS OPERATION 407 the one or more phone number detection parameters defined include, but are not limited to, any other phone number detection parameters desired by the provider of the method and apparatus for identifying scam e-mails using phone number analysis.

In one embodiment, at CREATE/DEFINE PHONE NUMBER DETECTION PARAMETERS OPERATION 407 data representing the one or more phone number detection parameters is entered into a computing system, such as user computing system(s) 100 of FIGS. 1 and 2 and/or a security system provider's computing system, such as security system provider computing system 150 of FIGS. 1 and 3 via one or more user interface devices such as, but not limited to, keyboards 207 and 307, mice 211 and 311, a touchpad, a touch screen, voice recognition and/or command software, or any other device for converting user actions into one or more computing system instructions as discussed herein, and/or as known in the art at the time of filing, and/or as developed after the time of filing.

In one embodiment, at CREATE/DEFINE PHONE NUMBER DETECTION PARAMETERS OPERATION 407 data representing the one or more phone number detection parameters is entered into a security system used to monitor e-mails coming into, and/or through, a given computing system. In one embodiment, the security system is a software application, a software module, a hardware device, and/or a combination of software and hardware, implemented, in whole or in part: on a given user's computing system, such as user computing system(s) 100 of FIGS. 1 and 2; on a security system provider's computing system, such as security system provider computing system 150 of FIGS. 1 and 3; on a third party computing system; on a server computing system; or on any combination of a given user's computing system, a security system provider's computing system, a server computing system, and/or a third party computing system.

Returning to FIG. 4, in some embodiments, data representing the one or more phone number detection parameters resides on the user computing system, such as user computing system(s) 100 of FIGS. 1 and 2. As noted above, in some embodiments, a user computing system includes a user memory system, such as user memory 230 (FIG. 2) that can store data and/or instructions associated with, but not limited to, a security system in a security system module, such as security system module 241 (FIG. 2) that includes procedures, data, and/or instructions, used by one or more processors, such as CPU(s) 201 (FIG. 2) and CPU(s) 301 (FIG. 3), for monitoring e-mail coming into, and/or through, the user computing system, such as user computing system(s) 100, and/or communicating with a security system provider computing system, such as security system provider computing system 150, of FIG. 1.

Returning to FIG. 4, in some embodiments, data representing the one or more phone number detection parameters resides on the security system provider computing system, such as security system provider computing system(s) 150 of FIGS. 1 and 3. As noted above, in some embodiments, a security system provider computing system includes a security system memory system, such as security system memory 330 (FIG. 3) that can store data and/or instructions associated with, but not limited to, a security system in a security system module, such as security system module 341 (FIG. 3) that includes procedures, data, and/or instructions, used by one or more processors, such as CPU(s) 201 (FIG. 2) and CPU(s) 301 (FIG. 3), for monitoring e-mail coming into, and/or through, the user computing system, such as user computing system(s) 100, and/or communicating with a security system provider computing system, such as security system provider computing system 150, of FIG. 1.

In one embodiment, once one or more phone number detection parameters are defined to minimize the risk of false positive results at CREATE/DEFINE PHONE NUMBER DETECTION PARAMETERS OPERATION 407, process flow proceeds to STORE DATA REPRESENTING THE PHONE NUMBER DETECTION PARAMETERS OPERATION 409.

In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored.

In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored on a security system provider computing system, such as security system provider computing system 150 of FIGS. 1 and 3. As noted above, in some embodiments, the security system provider computing system includes a security system memory system, such as security system memory 330 (FIG. 3), that includes a security system module, such as security system module 334 (FIG. 3), that includes a phone number detection parameters data module 347 that includes procedures, data, and/or instructions, for storing phone number detection parameters data.

In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored on a user computing system, such as user computing system 100 of FIGS. 1 and 2. As noted above, in some embodiments, the user computing system includes a user memory system, such as user memory system 230 (FIG. 2), that includes a security system module, such as security system module 234 (FIG. 2), that includes a phone number detection parameters data module 247 that includes procedures, data, and/or instructions, for storing phone number detection parameters data.

In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored, in whole, or in part, in any memory system, such as a user memory system, or server memory system, or a database, such as database 170, of FIG. 1, or in a cache memory, or in any main memory or mass memory, associated with any computing system. In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored, in whole, or in part, in any computing system and/or server system, or other device, in another location, or on/in a computer readable medium, and/or any other computer program product. In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored, in whole, or in part, on a webpage, in a web-based system on a network such as network 130 of FIG. 1. In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored, in whole, or in part, on a webpage, in a web-based system on a public network such as the Internet. In one embodiment, at STORE DATA REPRESENTING THE PHONE NUMBER DETECTION PARAMETERS OPERATION 409 data representing at least part of the one or more phone number detection parameters defined at CREATE/DEFINE PHONE NUMBER DETECTION PARAMETERS OPERATION 407 is stored, in whole, or in part, on a private network.

In one embodiment, once data representing at least part of the one or more phone number detection parameters defined at CREATE/DEFINE PHONE NUMBER DETECTION PARAMETERS OPERATION 407 is stored at STORE DATA REPRESENTING THE PHONE NUMBER DETECTION PARAMETERS OPERATION 409, process flow proceeds to SCAN INCOMING E-MAILS TO DETECT POTENTIAL PHONE NUMBERS USING THE PHONE NUMBER DETECTION PARAMETERS OPERATION 411.

In one embodiment, at SCAN INCOMING E-MAILS TO DETECT POTENTIAL PHONE NUMBERS USING THE PHONE NUMBER DETECTION PARAMETERS OPERATION 411 incoming e-mails are scanned under the direction of one or more processors by an e-mail security system associated with one or more computing systems to detect phone numbers present in the incoming e-mails using the one or more phone number detection parameters of CREATE/DEFINE PHONE NUMBER DETECTION PARAMETERS OPERATION 407.

In one embodiment, the set of potential scam e-mail identification rules are created at CREATE/DEFINE POTENTIAL SCAM E-MAIL IDENTIFICATION RULES OPERATION 403 and/or stored at STORE DATA REPRESENTING THE POTENTIAL SCAM E-MAIL IDENTIFICATION RULES OPERATION 405 a single time and/or are updated as needed. In one embodiment, the set of potential scam e-mail identification rules are created at CREATE/DEFINE POTENTIAL SCAM E-MAIL IDENTIFICATION RULES OPERATION 403 and/or stored at STORE DATA REPRESENTING THE POTENTIAL SCAM E-MAIL IDENTIFICATION RULES OPERATION 405 at a different time, and/or at a different location, than the scanning of e-mails performed at SCAN INCOMING E-MAILS TO DETECT POTENTIAL PHONE NUMBERS USING THE PHONE NUMBER DETECTION PARAMETERS OPERATION 411. In one embodiment, the set of potential scam e-mail identification rules are created at CREATE/DEFINE POTENTIAL SCAM E-MAIL IDENTIFICATION RULES OPERATION 403 and/or stored at STORE DATA REPRESENTING THE POTENTIAL SCAM E-MAIL IDENTIFICATION RULES OPERATION 405 using different computing systems than those used at SCAN INCOMING E-MAILS TO DETECT POTENTIAL PHONE NUMBERS USING THE PHONE NUMBER DETECTION PARAMETERS OPERATION 411.

In one embodiment, the phone number detection parameters are defined at CREATE/DEFINE PHONE NUMBER DETECTION PARAMETERS OPERATION 407 and/or stored at STORE DATA REPRESENTING THE PHONE NUMBER DETECTION PARAMETERS OPERATION 409 a single time and/or are updated as needed. In one embodiment, the phone number detection parameters are defined at CREATE/DEFINE PHONE NUMBER DETECTION PARAMETERS OPERATION 407 and/or stored at STORE DATA REPRESENTING THE PHONE NUMBER DETECTION PARAMETERS OPERATION 409 at a different time, and/or at a different location, than the scanning of e-mails performed at SCAN INCOMING E-MAILS TO DETECT POTENTIAL PHONE NUMBERS USING THE PHONE NUMBER DETECTION PARAMETERS OPERATION 411. In one embodiment, the phone number detection parameters are defined at CREATE/DEFINE PHONE NUMBER DETECTION PARAMETERS OPERATION 407 and/or stored at STORE DATA REPRESENTING THE PHONE NUMBER DETECTION PARAMETERS OPERATION 409 using different computing systems than those used at SCAN INCOMING E-MAILS TO DETECT POTENTIAL PHONE NUMBERS USING THE PHONE NUMBER DETECTION PARAMETERS OPERATION 411.

In one embodiment, at SCAN INCOMING E-MAILS TO DETECT POTENTIAL PHONE NUMBERS USING THE PHONE NUMBER DETECTION PARAMETERS OPERATION 411 any incoming e-mails are held/buffered on a security system provider computing system, such as security provider computing system 150 of FIGS. 1 and 3, or in another location under the control of the security system provider computing system, while the incoming e-mail is scanned for potential phone numbers.

In one embodiment, at SCAN INCOMING E-MAILS TO DETECT POTENTIAL PHONE NUMBERS USING THE PHONE NUMBER DETECTION PARAMETERS OPERATION 411 any incoming e-mails are held/buffered on a user computing system, such as user computing system 100 of FIGS. 1 and 2, or in another location under the control of the user computing system, while the incoming e-mail is scanned for potential phone numbers.

In one embodiment, incoming e-mails are scanned using one or more phone number detection parameters of CREATE/DEFINE PHONE NUMBER DETECTION PARAMETERS OPERATION 407 under the direction of one or more processors, such as CPUs 301 and/or 201, by an e-mail security system, such as security system modules 341 and/or 241 associated with one or more computing systems before passing the incoming e-mails to a given user computing system, such as user computing system 100 of FIGS. 1 and 2.

As noted above, in one embodiment, at CREATE/DEFINE PHONE NUMBER DETECTION PARAMETERS OPERATION 407 one or more of the phone number detection parameters are defined, at least in part, to minimize the risk of false positive results. In one embodiment, at CREATE/DEFINE PHONE NUMBER DETECTION PARAMETERS OPERATION 407 the incoming e-mails are scanned to determine the presence of international prefixes and/or area codes.

In one embodiment, at CREATE/DEFINE PHONE NUMBER DETECTION PARAMETERS OPERATION 407 the incoming e-mails are scanned to determine the presence of keywords, text, or phrases, and/or punctuation, such as "call", "call me", "phone", "fon", "telephone", "Tel::, "Tel-", "(Tel)", etc., in a given language, followed by numbers.

In one embodiment, at CREATE/DEFINE PHONE NUMBER DETECTION PARAMETERS OPERATION 407 the incoming e-mails are scanned to determine the presence of a defined number of numbers.

In one embodiment, at CREATE/DEFINE PHONE NUMBER DETECTION PARAMETERS OPERATION 407 the incoming e-mails are scanned to determine punctuation and/or structure of numbers such as parentheses encasing a defined number of numbers such as (408) indicating an area code in the United States.

In one embodiment, at CREATE/DEFINE PHONE NUMBER DETECTION PARAMETERS OPERATION 407 the incoming e-mails are scanned using any other phone number detection parameters desired by the provider of the method and apparatus for identifying scam e-mails using phone number analysis.

In one embodiment, once incoming e-mails are scanned under the direction of one or more processors by an e-mail security system associated with one or more computing systems to detect phone numbers present in the incoming e-mails using the one or more phone number detection parameters of CREATE/DEFINE PHONE NUMBER DETECTION PARAMETERS OPERATION 407 at SCAN INCOMING E-MAILS TO DETECT POTENTIAL PHONE NUMBERS USING THE PHONE NUMBER DETECTION PARAMETERS OPERATION 411, process flow proceeds to IDEN-

TIFY ONE OR MORE POTENTIAL PHONE NUMBERS IN ONE OR MORE E-MAILS OPERATION 413.

In one embodiment, at IDENTIFY ONE OR MORE POTENTIAL PHONE NUMBERS IN ONE OR MORE E-MAILS OPERATION 413, by virtue of the scan of SCAN INCOMING E-MAILS TO DETECT POTENTIAL PHONE NUMBERS USING THE PHONE NUMBER DETECTION PARAMETERS OPERATION 411, one or more incoming e-mails are determined to contain at least one potential phone number.

In one embodiment, once one or more incoming e-mails are determined to contain at least one potential phone number at IDENTIFY ONE OR MORE POTENTIAL PHONE NUMBERS IN ONE OR MORE E-MAILS OPERATION 413 by virtue of the scan of SCAN INCOMING E-MAILS TO DETECT POTENTIAL PHONE NUMBERS USING THE PHONE NUMBER DETECTION PARAMETERS OPERATION 411, process flow proceeds to NORMALIZE THE IDENTIFIED ONE OR MORE POTENTIAL PHONE NUMBERS OPERATION 415.

In one embodiment, at NORMALIZE THE IDENTIFIED ONE OR MORE POTENTIAL PHONE NUMBERS OPERATION 415 any potential phone numbers detected using the one or more phone number detection parameters at IDENTIFY ONE OR MORE POTENTIAL PHONE NUMBERS IN ONE OR MORE E-MAILS OPERATION 413 are normalized and condensed into a sequence of numbers under the direction of one or more processors.

In one embodiment, at NORMALIZE THE IDENTIFIED ONE OR MORE POTENTIAL PHONE NUMBERS OPERATION 415 any potential phone numbers detected using the one or more phone number detection parameters at IDENTIFY ONE OR MORE POTENTIAL PHONE NUMBERS IN ONE OR MORE E-MAILS OPERATION 413 are processed into a sequence of "pure" numbers under the direction of one or more processors, such as CPUs 201 and/or 201, such that all non-numeric symbols are removed, all empty spaces are removed, and/or defined initial numbers, such as an initial "0", are removed.

In one embodiment, this processing helps defeat any obfuscation techniques that might be employed by the perpetrator of an e-mail scam to hide the fact they have included phone numbers and/or to hide the actual number supplied. In one embodiment, the processing also helps in the further analysis of any potential phone numbers detected using the one or more phone number detection parameters at IDENTIFY ONE OR MORE POTENTIAL PHONE NUMBERS IN ONE OR MORE E-MAILS OPERATION 413.

In one embodiment, once any potential phone numbers detected using the one or more phone number detection parameters at IDENTIFY ONE OR MORE POTENTIAL PHONE NUMBERS IN ONE OR MORE E-MAILS OPERATION 413 are processed into a sequence of numbers under the direction of one or more processors at NORMALIZE THE IDENTIFIED ONE OR MORE POTENTIAL PHONE NUMBERS OPERATION 415, process flow proceeds to ANALYZE THE ONE OR MORE POTENTIAL PHONE NUMBERS USING THE DATA REPRESENTING THE POTENTIAL SCAM E-MAIL IDENTIFICATION RULES OPERATION 417.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are then analyzed using the potential scam e-mail identification rules data of STORE DATA REPRESENTING THE POTENTIAL SCAM E-MAIL IDENTIFICATION RULES OPERATION 405.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed and processed potential phone numbers indicating a defined suspicious country of origin, such as Nigeria, are labeled as potential scam phone numbers.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed and processed potential phone numbers indicating a defined suspicious area of origin within a country, such as New York, are labeled as potential scam phone number while processed potential phone numbers including phone numbers in a defined safe area, such as Washington D.C., are labeled as probable legitimate phone numbers.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed and processed potential phone numbers indicating a defined phone type, such as processed potential phone numbers associated with mobile phones, are labeled as potential scam phone numbers while processed potential phone numbers including phone numbers associated with land-line phones are labeled as probable legitimate phone numbers or vice-versa.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed and processed potential phone numbers indicating a defined phone number type, such as a forwarding phone number, a personal phone number, a Voice Over IP phone number, or any other phone number that can easily be re-directed, are labeled as potential scam phone numbers.

In one embodiment, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed and processed potential phone numbers known to be scam phone numbers, or containing known scam phone number sequences, are labeled as potential scam phone numbers.

In various other embodiments, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed using any other potential scam e-mail identification rules desired by the provider of process for identifying scam e-mails using phone number analysis 400 and/or one or more users of the process for identifying scam e-mails using phone number analysis 400.

In various other embodiments, at ANALYZE THE ONE OR MORE POTENTIAL PHONE NUMBERS USING THE DATA REPRESENTING THE POTENTIAL SCAM E-MAIL IDENTIFICATION RULES OPERATION 417 the processed potential phone numbers of NORMALIZE THE IDENTIFIED ONE OR MORE POTENTIAL PHONE NUMBERS OPERATION 415 are analyzed under the direction of one or more processors, such as CPUs 201 and/or 301 of FIGS. 1, 2, and 3 and/or using an analysis module, such as analysis modules 253 and/or 353 of FIGS. 2 and 3.

Returning to FIG. 4, in one embodiment, once the processed potential phone numbers of NORMALIZE THE IDENTIFIED ONE OR MORE POTENTIAL PHONE NUMBERS OPERATION 415 are analyzed using the potential scam e-mail identification rules data of STORE DATA REPRESENTING THE POTENTIAL SCAM E-MAIL IDENTIFICATION RULES OPERATION 405 at ANALYZE THE ONE OR MORE POTENTIAL PHONE NUMBERS USING THE DATA REPRESENTING THE POTENTIAL SCAM E-MAIL IDENTIFICATION RULES OPERATION 417, process flow proceeds to APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers indicating a defined suspicious country of origin, such as Nigeria, have data indicating their status transformed to indicate a status of potential scam e-mail.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers indicating a defined suspicious area of origin within a country, such as New York, have data indicating their status transformed to indicate a status of potential scam e-mail while e-mails including processed potential phone numbers including phone numbers a defined safe area, such as Washington D.C., have data indicating their status transformed to indicate a status of potential legitimate e-mail.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers indicating a defined phone type, such as processed potential phone numbers associated with mobile phones, have data indicating their status transformed to indicate a status of potential scam e-mail while e-mails including processed potential phone numbers including phone numbers associated with land-line phones have data indicating their status transformed to indicate a status of potential legitimate e-mail or vice-versa.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers indicating a defined phone number type, such as a forwarding phone number, a personal phone number, a Voice Over IP phone number, or any other phone number that can easily be re-directed, have data indicating their status transformed to indicate a status of potential scam e-mail.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers known to be scam phone numbers, or containing known scam phone number sequences, have data indicating their status transformed to indicate a status of potential scam e-mail.

In one embodiment, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 and e-mails including processed potential phone numbers and defined text and/or terms such as "money", "lottery", "help", etc. have data indicating their status transformed to indicate a status of potential scam e-mail.

In various other embodiments, at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 any other potential scam e-mail identification rules desired by the provider of process for identifying scam e-mails using phone number analysis 400 the and/or one or more users of process for identifying scam e-mails using phone number analysis 400.

In one embodiment, once the potential scam e-mail identification rules of STORE DATA REPRESENTING THE POTENTIAL SCAM E-MAIL IDENTIFICATION RULES OPERATION 405 are applied to the e-mails of SCAN INCOMING E-MAILS TO DETECT POTENTIAL PHONE NUMBERS USING THE PHONE NUMBER DETECTION PARAMETERS OPERATION 411 at APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419, process flow proceeds to SUBJECT ONE OR MORE OF THE ONE OR MORE E-MAILS TO ONE OR MORE PROTECTIVE MEASURES ACCORDING TO THE POTENTIAL SCAM E-MAIL RULES OPERATION 421.

In one embodiment, at SUBJECT ONE OR MORE OF THE ONE OR MORE E-MAILS TO ONE OR MORE PROTECTIVE MEASURES ACCORDING TO THE POTENTIAL SCAM E-MAIL RULES OPERATION 421 the identified potential scam e-mails of APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 are subjected to one or more protective measures, such as, but not limited to, blocking, quarantining, further analysis, labeling and/or tagging, redirection to a specific address and/or location for further processing, buffering, or any other protective measure discussed herein, and/or as known in the art at the time of filing, and/or as developed after the time of filing.

In one embodiment, at SUBJECT ONE OR MORE OF THE ONE OR MORE E-MAILS TO ONE OR MORE PROTECTIVE MEASURES ACCORDING TO THE POTENTIAL SCAM E-MAIL RULES OPERATION 421 the identified potential scam e-mails of APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 are subjected to one or more protective measures using a protective measures module, such as protective measures modules 255 and/or 355 of FIGS. 2 and 3.

In one embodiment, at SUBJECT ONE OR MORE OF THE ONE OR MORE E-MAILS TO ONE OR MORE PROTECTIVE MEASURES ACCORDING TO THE POTENTIAL SCAM E-MAIL RULES OPERATION 421 the identified potential scam e-mails of APPLY THE POTENTIAL SCAM E-MAIL IDENTIFICATION RULES TO THE ONE OR MORE E-MAILS INCLUDING THE ONE OR MORE POTENTIAL PHONE NUMBERS OPERATION 419 and the phone numbers detected in the identified potential scam e-mails are also added to a scam e-mail detection database and/or are used to create new potential scam e-mail identification rules.

Using one embodiment of process for identifying scam e-mails using phone number analysis 400, e-mails can be reliably identified based on the presence of phone numbers using one or more potential scam e-mail identification rules that avoid large numbers of false positives and unnecessary delays and analysis of legitimate e-mails. In addition, process for identifying scam e-mails using phone number analysis 400 uses one or more phone number detection parameters to avoid analysis and false positive events based on numbers other than phone numbers, such as dates, times, message IDs etc. In addition, by using one or more phone number detection parameters and potential scam e-mail identification rules, and/or modifying the one or more phone number detection parameters and potential scam e-mail identification rules, process for identifying scam e-mails using phone number analysis 400 makes it much harder for perpetrators of Nigerian 419 e-mail scams to hide phone numbers by: adding or deleting country codes, international calling access codes, characters and/or spaces; intentionally misspelling words; and/or various other, and seemingly ever-evolving, obfuscation techniques.

As a result, using process for identifying scam e-mails using phone number analysis 400, far more of these harmful, and at times dangerous, e-mails can be identified and stopped than is possible using currently available methods and systems.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Herein, embodiments have been discussed with reference to the accompanying FIG.s, which depict one or more exemplary embodiments. The above description includes reference to specific embodiments for illustrative purposes. However, the illustrative discussion above is not intended to be exhaustive or to limit the invention to the precise forms disclosed. Many modifications and variations are possible in view of the teachings below. The embodiments discussed above were chosen and described in order to explain the principles of the invention, and its practical applications, to thereby enable others skilled in the art to utilize the invention and various embodiments with various modifications as may be suited to the particular use contemplated. Therefore, embodiments may be embodied in many different forms than those shown and discussed herein and should not be construed as limited to the embodiments set forth herein, shown in the FIG.s, and/or described below. In addition, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "monitoring", "obtaining", "requesting", "storing", "saving", "classifying", "comparing", "calculating", "processing", "using", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicably coupled to similar and/or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s for method and apparatus and/or process or application for providing scroll bar enabled bookmarks in electronic document displays, discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for identifying scam e-mails using phone number analysis comprising:
    defining one or more potential scam e-mail identification rules;
    storing data representing the one or more potential scam e-mail identification rules in a data storage device;
    defining one or more phone number detection parameters;
    storing data representing the one or more phone number detection parameters in a data storage device;
    using one or more processors associated with at least one computing system to scan e-mails directed to a given computing system using the one or more phone number detection parameters to identify any potential phone numbers in the e-mails directed to the given computing system;
    identifying one or more potential phone numbers in at least one of the e-mails directed to the given computing system;
    using the one or more processors associated with at least one computing system to normalize the identified one or more potential phone numbers in at least one of the e-mails directed to the given computing system;
    using the one or more processors associated with at least one computing system to analyze the normalized one or more potential phone numbers in at least one of the e-mails directed to the given computing system using the data representing the one or more potential scam e-mail identification rules to identify potential scam phone numbers of the one or more potential phone numbers in at least one of the e-mails directed to the given computing system; and
    applying the one or more potential scam e-mail identification rules to the at least one of the e-mails directed to the given computing system that includes the identified potential scam phone numbers to transform a status of the at least one of the e-mails directed to the given computing system that includes the identified potential scam phone numbers to the status of potential scam e-mail.

2. The computing system implemented process for identifying scam e-mails using phone number analysis of claim 1, wherein:

at least one of the one or more potential scam e-mail identification rules is selected from the group of potential scam e-mail identification rules consisting of:
one or more rules requiring that e-mails including phone numbers indicating a defined suspicious country of origin be given a status of potential scam e-mail;
one or more rules requiring that e-mails including phone numbers indicating a defined suspicious area of origin within a country be given a status of potential scam e-mail;
one or more rules requiring that e-mails including phone numbers indicating a defined phone type be given a status of potential scam e-mail;
one or more rules requiring that e-mails including phone numbers of a defined type be given a status of potential scam e-mail;
one or more rules requiring that e-mails including specific known scam phone numbers, or number sequences, be given a status of potential scam e-mail; and
one or more rules requiring that e-mails including phone numbers and defined text be given a status of potential scam e-mail.

3. The computing system implemented process for identifying scam e-mails using phone number analysis of claim 1, wherein:
at least one of the one or more phone number detection parameters is selected from the group of phone number detection parameters consisting of:
the presence of international prefixes;
the presence of area codes;
the presence of defined keywords, text, punctuation, or phrases, in a given language, followed by numbers;
the presence of a defined number of numbers; and
the presence of defined formatting of numbers.

4. The computing system implemented process for identifying scam e-mails using phone number analysis of claim 1, further comprising:
preventing the at least one of the e-mails directed to the given computing system having the status of potential scam e-mail from being passed to the given computing system.

5. The computing system implemented process for identifying scam e-mails using phone number analysis of claim 4, further comprising:
preventing the at least one of the e-mails directed to the given computing system having the status of potential scam e-mail from being passed to the given computing system and performing further analysis on the at least one of the e-mails directed to the given computing system having the status of potential scam e-mail.

6. The computing system implemented process for identifying scam e-mails using phone number analysis of claim 5, wherein:
performing further analysis on the at least one of the e-mails directed to the given computing system having the status of potential scam e-mail includes requesting input from a user of the given computing system regarding the at least one of the e-mails directed to the given computing system having the status of potential scam e-mail.

7. The computing system implemented process for identifying scam e-mails using phone number analysis of claim 1, wherein:
the one or more processors associated with at least one computing system are one or more processors associated with at least one security system provider computing system.

8. The computing system implemented process for identifying scam e-mails using phone number analysis of claim 1, wherein:
the one or more processors associated with at least one computing system are one or more processors associated with the given computing system.

9. A system for identifying scam e-mails using phone number analysis comprising:
a user computing system;
a security system associated with the user computing system;
a security system provider computing system;
a least one processor associated with the security system provider computing system, the at least one processor associated with the security system provider computing system executing at least part of a computing system implemented process for identifying scam e-mails using phone number analysis, the computing system implemented process for identifying scam e-mails using phone number analysis comprising:
defining one or more potential scam e-mail identification rules;
storing data representing the one or more potential scam e-mail identification rules in a data storage device;
defining one or more phone number detection parameters;
storing data representing the one or more phone number detection parameters in a data storage device;
using the at least one processor associated with the security service provider computing system to scan e-mails directed to the user computing system using the one or more phone number detection parameters to identify any potential phone numbers in the e-mails directed to the user computing system;
identifying one or more potential phone numbers in at least one of the e-mails directed to the user computing system;
using the at least one processor associated with the security system provider computing system to normalize the identified one or more potential phone numbers in at least one of the e-mails directed to the user computing system;
using the at least one processor associated with the security system provider computing system to analyze the normalized one or more potential phone numbers in at least one of the e-mails directed to the user computing system using the data representing the one or more potential scam e-mail identification rules to identify potential scam phone numbers of the one or more potential phone numbers in at least one of the e-mails directed to the user computing system; and
applying the one or more potential scam e-mail identification rules to the at least one of the e-mails directed to the user computing system that includes the identified potential scam phone numbers to transform a status of the at least one of the e-mails directed to the user computing system that includes the identified potential scam phone numbers to the status of potential scam e-mail.

10. The computing system implemented process for identifying scam e-mails using phone number analysis of claim 9, wherein:
at least one of the one or more potential scam e-mail identification rules is selected from the group of potential scam e-mail identification rules consisting of:
one or more rules requiring that e-mails including phone numbers indicating a defined suspicious country of origin be given a status of potential scam e-mail;

one or more rules requiring that e-mails including phone numbers indicating a defined suspicious area of origin within a country be given a status of potential scam e-mail;

one or more rules requiring that e-mails including phone numbers indicating a defined phone type be given a status of potential scam e-mail;

one or more rules requiring that e-mails including phone numbers of a defined type be given a status of potential scam e-mail;

one or more rules requiring that e-mails including specific known scam phone numbers, or number sequences, be given a status of potential scam e-mail; and one or more rules requiring that e-mails including phone numbers and defined text be given a status of potential scam e-mail.

11. The computing system implemented process for identifying scam e-mails using phone number analysis of claim 9, wherein:

at least one of the one or more phone number detection parameters is selected from the group of phone number detection parameters consisting of:

the presence of international prefixes;

the presence of area codes;

the presence of defined keywords, text, punctuation, or phrases, in a given language, followed by numbers;

the presence of a defined number of numbers; and the presence of defined formatting of numbers.

12. The computing system implemented process for identifying scam e-mails using phone number analysis of claim 9, further comprising:

preventing the at least one of the e-mails directed to the user computing system having the status of potential scam e-mail from being passed to the user computing system.

13. The computing system implemented process for identifying scam e-mails using phone number analysis of claim 12, further comprising:

preventing the at least one of the e-mails directed to the user computing system having the status of potential scam e-mail from being passed to the user computing system and performing further analysis on the at least one of the e-mails directed to the user computing system having the status of potential scam e-mail.

14. The computing system implemented process for identifying scam e-mails using phone number analysis of claim 13, wherein:

performing further analysis on the at least one of the e-mails directed to the user computing system having the status of potential scam e-mail includes requesting input from a user of the user computing system regarding the at least one of the e-mails directed to the user computing system having the status of potential scam e-mail.

15. A system for identifying scam e-mails using phone number analysis comprising:

a user computing system;

a least one processor associated with the user computing system, the at least one processor associated with the user computing system executing at least part of a computing system implemented process for identifying scam e-mails using phone number analysis, the computing system implemented process for identifying scam e-mails using phone number analysis comprising:

defining one or more potential scam e-mail identification rules;

storing data representing the one or more potential scam e-mail identification rules in a data storage device;

defining one or more phone number detection parameters;

storing data representing the one or more phone number detection parameters in a data storage device;

using the at least one processor associated with the user computing system to scan e-mails directed to the user computing system using the one or more phone number detection parameters to identify any potential phone numbers in the e-mails directed to the user computing system;

identifying one or more potential phone numbers in at least one of the e-mails directed to the user computing system;

using the at least one processor associated with the user computing system to normalize the identified one or more potential phone numbers in at least one of the e-mails directed to the user computing system;

using the at least one processor associated with the user computing system to analyze the normalized one or more potential phone numbers in at least one of the e-mails directed to the user computing system using the data representing the one or more potential scam e-mail identification rules to identify potential scam phone numbers of the one or more potential phone numbers in at least one of the e-mails directed to the user computing system; and applying the one or more potential scam e-mail identification rules to the at least one of the e-mails directed to the user computing system that includes the identified potential scam phone numbers to transform a status of the at least one of the e-mails directed to the user computing system that includes the identified potential scam phone numbers to the status of potential scam e-mail.

16. The computing system implemented process for identifying scam e-mails using phone number analysis of claim 15, wherein:

at least one of the one or more potential scam e-mail identification rules is selected from the group of potential scam e-mail identification rules consisting of:

one or more rules requiring that e-mails including phone numbers indicating a defined suspicious country of origin be given a status of potential scam e-mail;

one or more rules requiring that e-mails including phone numbers indicating a defined suspicious area of origin within a country be given a status of potential scam e-mail;

one or more rules requiring that e-mails including phone numbers indicating a defined phone type be given a status of potential scam e-mail;

one or more rules requiring that e-mails including phone numbers of a defined type be given a status of potential scam e-mail;

one or more rules requiring that e-mails including specific known scam phone numbers, or number sequences, be given a status of potential scam e-mail; and one or more rules requiring that e-mails including phone numbers and defined text be given a status of potential scam e-mail.

17. The computing system implemented process for identifying scam e-mails using phone number analysis of claim 15, wherein:

at least one of the one or more phone number detection parameters is selected from the group of phone number detection parameters consisting of:

the presence of international prefixes;

the presence of area codes;

the presence of defined keywords, text, or phrases, punctuation, in a given language, followed by numbers;

the presence of a defined number of numbers; and the presence of defined formatting of numbers.

18. The computing system implemented process for identifying scam e-mails using phone number analysis of claim 15, further comprising:

preventing the at least one of the e-mails directed to the user computing system having the status of potential scam e-mail from being passed to an e-mail inbox associated with the user computing system.

19. The computing system implemented process for identifying scam e-mails using phone number analysis of claim 18, further comprising:

preventing the at least one of the e-mails directed to the user computing system having the status of potential scam e-mail from being passed to the e-mail inbox associated with the user computing system and performing further analysis on the at least one of the e-mails directed to the user computing system having the status of potential scam e-mail.

20. The computing system implemented process for identifying scam e-mails using phone number analysis of claim 19, wherein:

performing further analysis on the at least one of the e-mails directed to the user computing system having the status of potential scam e-mail includes requesting user input regarding the at least one of the e-mails directed to a given computing system having the status of potential scam e-mail.

* * * * *